US008903840B2

(12) United States Patent
Bauchot et al.

(10) Patent No.: US 8,903,840 B2
(45) Date of Patent: Dec. 2, 2014

(54) SYSTEM AND METHOD FOR LAUNCHING A SPECIFIC PROGRAM FROM A SIMPLE CLICK ON A STRING OF CHARACTERS

(75) Inventors: Frederic Bauchot, Saint-Jeannet (FR); Godefroy Dine, Villeneuve-Loubet (FR); Stephane Charles Lebrun, Biot (FR); Gerard Marmigère, Drap (FR)

(73) Assignee: International Business Machines Corporation, Armonk, NY (US)

( * ) Notice: Subject to any disclaimer, the term of this patent is extended or adjusted under 35 U.S.C. 154(b) by 1312 days.

(21) Appl. No.: 11/764,222

(22) Filed: Jun. 17, 2007

(65) Prior Publication Data

US 2008/0059463 A1    Mar. 6, 2008

(30) Foreign Application Priority Data

Aug. 31, 2006    (EP) .................................... 06300904

(51) Int. Cl.
  *G06F 17/30* (2006.01)
  *G06F 9/445* (2006.01)
(52) U.S. Cl.
  CPC ..................................... *G06F 9/445* (2013.01)
  USPC ........................... 707/759; 707/765; 707/781
(58) Field of Classification Search
  USPC .......... 707/1, 3, 6, 104.1, 759, 765, 781, 792, 707/812; 709/229
  See application file for complete search history.

(56) References Cited

U.S. PATENT DOCUMENTS

| 6,505,191 | B1 |   | 1/2003  | Baclawski |          |
|-----------|----|---|---------|-----------|----------|
| 6,564,254 | B1 | * | 5/2003  | Shoji et al. | 709/217 |
| 6,829,767 | B2 | * | 12/2004 | Cronk et al. | 718/108 |
| 7,191,436 | B1 | * | 3/2007  | Durr et al. | 717/170 |
| 7,203,737 | B2 | * | 4/2007  | Starbuck et al. | 709/219 |
| 7,231,460 | B2 | * | 6/2007  | Sullivan et al. | 709/246 |
| 7,421,645 | B2 | * | 9/2008  | Reynar | 715/206 |
| 7,424,543 | B2 | * | 9/2008  | Rice, III | 709/229 |
| 7,451,389 | B2 | * | 11/2008 | Huynh et al. | 715/230 |
| 7,496,854 | B2 | * | 2/2009  | Hedloy | 715/780 |
| 7,512,904 | B2 | * | 3/2009  | Matthews et al. | 715/854 |
| 7,725,476 | B2 | * | 5/2010  | Waggoner | 707/758 |
| 2002/0035581 | A1 | * | 3/2002 | Reynar et al. | 707/513 |
| 2005/0234875 | A1 | * | 10/2005 | Auerbach et al. | 707/3 |
| 2006/0136389 | A1 | * | 6/2006 | Cover et al. | 707/3 |
| 2006/0242712 | A1 | * | 10/2006 | Linn et al. | 726/26 |
| 2007/0294256 | A1 | * | 12/2007 | Averett et al. | 707/10 |

OTHER PUBLICATIONS

A. Dey, G. Abowd, A. Wood, "CyberDesk: a Framework for Providing Self-integrating Context-aware Services", Published 1998 in "International Conference on Intelligent User Interfaces", IUI San Francisco, CA, ACM, Jan. 6, 1998, pp. 47-54.*
Patent application for U.S. Appl. No. 14/478,034, filed Sep. 5, 2014, Conf. No. 1100.

* cited by examiner

*Primary Examiner* — Fred I Ehichioya
*Assistant Examiner* — Dangelino Gortayo
(74) *Attorney, Agent, or Firm* — Schmeiser, Olsen & Watts, LLP; John Pivnichny

(57) ABSTRACT

A method, system and computer program for automatically launching a target application based on characteristics of a selected string of characters in a source application includes the steps of receiving a command resulting from a user's action, selecting a string of characters in a source application; identifying among one or a plurality of predefined regular expressions, a regular expression matching the selected string of character; identifying a predefined data type previously associated with the source application and the regular expression matching the selected string of character; identifying a predefined target application previously associated with the identified data type and the source application; and launching the target application.

9 Claims, 3 Drawing Sheets

Parser Table 200　　　210　　　　　　　　　220

| REGULAR EXPRESSION | DATA TYPE |
|---|---|
| | :MSISDN |
| | Email |
| | GSM MSISDN |
| | |
| | |

Launcher Table 250　260　265　270　275

| DATA TYPE | ACTIVE APPL | TARGET APPL | USAGE Frequency |
|---|---|---|---|
| MSISDN | * | click2dial | |
| GSM MSISDN | * | click2dial | 90 |
| GSM MSISDN | * | SMS | 10 |
| Email | Word | outlook | |
| Email | Wordpro | Lotus note | |

SYSTEM AND METHOD FOR LAUNCHING A SPECIFIC PROGRAM FROM A SIMPLE CLICK ON A STRING OF CHARACTERS

CROSS-REFERENCE TO RELATED APPLICATIONS

This application claims priority from EPO Patent Application Serial No. EP06300904 filed on Aug. 31, 2006 and entitled SYSTEM AND METHOD FOR LAUNCHING A SPECIFIC PROGRAM FROM A SIMPLE CLICK ON A STRING OF CHARACTERS.

FIELD OF THE INVENTION

This invention relates generally to the field of computer programs, and more particularly to a computer system and method for automatically launching a program or executing a specific action from a simple keyboard or mouse operation on a string of characters.

BACKGROUND OF THE INVENTION

When working in an application, users often have the need to run another application (such as a mail application, a presentation, agenda, etc.) or to execute a specific action represented by a string of characters. The problem is that when the user reads a string of characters that he/she needs for another purpose, he/she must make a separate note including this string, or copy this string in a clipboard and then paste it in another application.

According to the prior art, the hyperlink function provides the ability to start a web browser from a specific string of characters in a text. The example hereafter illustrates this prior art. The fact of writing "www." followed by other characters such as "ibm.com" is automatically recognized in an office application like Lotus® WordPro as a web page, and the string is outlined in blue and underlined. Once the mouse cursor is on the string, when the user clicks on or executes a sequence of keys (Ctrl/click), he/she automatically opens a web browser such as Mozilla Firefox or Microsoft Internet Explorer, and opens the written url. This ability must be set in the program where the string is written. For a text written with Microsoft® Word, the automatic formatting of hyperlinks must be kept "on" in the settings by selecting "tools"—"autocorrect options"—tab "Autoformat as you type"—and select "Internet and network paths with hyperlinks."

Another possibility is to use a hyperlink associated with an e-mail address, for instance genius@emc2.de. In this particular case, a Ctrl/click action will open the user's favorite mail application, and will allow him to send a mail to the owner of this mail address.

The two examples above show that it is possible to start unique applications, based on a specific and fixed string of characters, which has been previously associated with the unique application. There is no way of performing this function other than opening a web browser for a web address, and writing an e-mail for a mail address.

Other prior art examples may be found, such as the ability to click on a phone number when running a specific phone application, but in all cases the scheme is the following: within a specific application or program, inputting a specific string of characters to allow the user to reach a unique application, and always the same application.

SUMMARY OF THE INVENTION

Briefly stated, a method, system and computer program for automatically launching a target application based on characteristics of a selected string of characters in a source application includes the steps of receiving a command resulting from a user's action, selecting a string of characters in a source application; identifying among one or a plurality of predefined regular expressions, a regular expression matching the selected string of character; identifying a predefined data type previously associated with the source application and the regular expression matching the selected string of character; identifying a predefined target application previously associated with the identified data type and the source application; and launching the target application.

According to an embodiment of the invention, a method for automatically launching a target application based on characteristics of a selected string of characters in a source application includes the steps of (a) receiving a command resulting from a user's action selecting a string of characters in a source application; (b) identifying among one or a plurality of predefined regular expressions, a regular expression matching the selected string of characters; (c) identifying a predefined data type previously associated with the source application and the regular expression matching the selected string of characters; (d) identifying a predefined target application previously associated with the identified data type and the source application; and (e) launching the target application.

According to an embodiment of the invention, a system for automatically launching a target application based on characteristics of a selected string of characters in a source application includes means for receiving a command resulting from a user's action selecting a string of characters in a source application; means for identifying among one or a plurality of predefined regular expressions, a regular expression matching the selected string of characters; means for identifying a predefined data type previously associated with the source application and the regular expression matching the selected string of characters; means for identifying a predefined target application previously associated with the identified data type and the source application; and means for launching the target application.

According to an embodiment of the invention, a program product comprising program codes stored in a computer readable storage medium implements the steps of (a) receiving a command resulting from a user's action selecting a string of characters in a source application; (b) identifying among one or a plurality of predefined regular expressions, a regular expression matching the selected string of characters; (c) identifying a predefined data type previously associated with the source application and the regular expression matching the selected string of characters; (d) identifying a predefined target application previously associated with the identified data type and the source application; and (e) launching the target application.

BRIEF DESCRIPTION OF THE DRAWINGS

FIG. 2A shows a Parser Table structure which is used to determine the data type according to the present invention.

FIG. 2B shows a Launcher Table structure which is used to determine the application to be launched according to the data type according to the present invention.

DETAILED DESCRIPTION OF THE PREFERRED EMBODIMENT

Figure 1A:
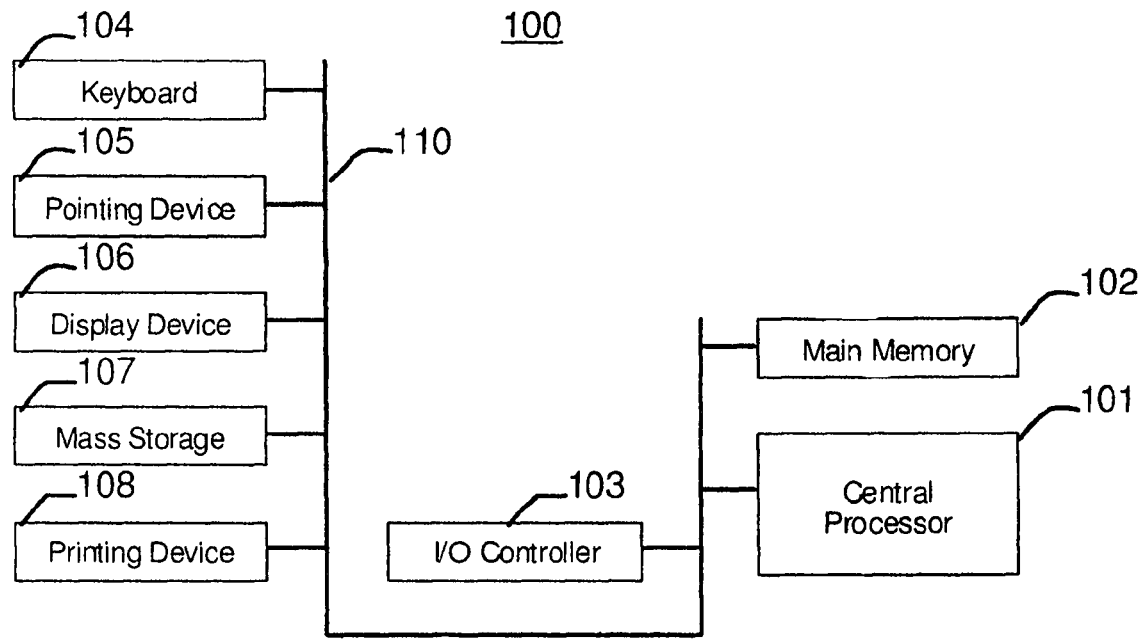
FIG. 1A shows a block diagram of a computer system in which the present invention may be embodied.

The invention is partially based on the use of regular expressions. Regular expressions are used for the recognition of patterns in texts.

A regular expression, often called a pattern, is an expression that describes a set of strings. Regular expressions are usually used to give a concise description of a set without having to list all elements. For example, the set containing the three strings Handel, Händel, and Haendel can be described by the pattern "H(ä|ae?)ndel", or alternatively, it is said that the pattern matches each of the three strings. As a side note, there are usually multiple different patterns describing any given set.

Most formalisms provide the following operations to construct regular expressions:

(a) Alternation. A vertical bar separates alternatives. For example, "gray|grey" matches gray or grey.

(b) Grouping. Parentheses are used to define the scope and precedence of the operators. For example, "gray|grey" and "gr(a|e)y" are different patterns, but they both describe the set containing gray and grey.

(c) Quantification. A quantifier after a character or group specifies how often that preceding expression is allowed to occur. The most common quantifiers are ?, *, and +. The question mark "?" indicates there is 0 or 1 in the previous expression (character). For example, "colou?r" matches both color and colour. The asterisk "*" indicates there are 0, 1 or any number of the previous expression. For example, "go*gle" matches ggle, gogle, google, etc. The plus sign "+" indicates that there is at least 1 of the previous expression. For example, "go+gle" matches gogle, google, etc. . . . but not ggle.

These constructions can be combined to form arbitrarily complex expressions, very much like one can construct arithmetical expressions from the numbers and the operations +, −, * and /.

"H(ae?|ä)ndel" and "H(a|ae|ä)ndel" are valid patterns, and furthermore, they both match the same strings as the example from the beginning of the Detailed Description. The pattern "((great)*grand)?(father|mother)" matches any ancestor: father, mother, grand father, grand mother, great grand father, great grand mother, great great grand father, great great grand mother, great great great grand father, great great great grand mother and so on.

Example of syntax. The precise syntax for regular expressions varies among tools and application areas. Examples of syntax for the regular expression are available on the Web by searching under "syntax regular expression."

Meta characters.
Escape character \
Single Character Meta characters
. Matches any one character
[ . . . ] Matches any one character in a set
[^ . . . ] Matches any one character not in the set
[:class:] Character classes
    {[:alnum:]] [[:alpha:]] [[:blank:]] [[:cntrl:]] [[:digit:]] [[:graph:]]
    [[:lower:]] [[:print:}] {[:punct:}] {[:space:}] {[:upper:}] [{:xdigit:]
Quantifiers.
? Matches the previous character zero or one times
* Matches the previous character zero or more times
+ Matches the previous character one or more times
\{n\} Matches the previous character n times
\{n,m\} Matches the previous character at least n & at most m
\{n,\} Matches the previous character n or more times
Anchors.
^ Matching at the start the line
$ Matching at the end of line
\< Matching at start of word
\> Matching at end of word
\b Matching at the beginning or the end of a word
\B Matching any character not at the beginning or end of word
Grouping \(\)
Backreference \1 \2 . . . \9

Table 1 shows examples of items and their regular expressions.

TABLE 1

| Item | Regular Expression |
|---|---|
| Postal State Abbr | [A-Z]\{2\} |
| City, State | .+, [A-Z]\{2\} |
| Month, day, year | [A-Z][a-z]\{2,9\} [0-9]\{1,2\} [0-9]\{2,4\} |
| Formatted Dollar | \$[0-9]*\.[0-9][0-9] |
| Local Phone number | [0-9]\{3|\}–[0-9]\{4\} |
| Floating point number | −?[0-9]+\.[0-9]+ |
| Hexadecimal number | 0x[0-9a-fA-F]+ |
| Any line | ^.*$ |
| Blank line | ^$ |
| html inline code | <[^>]+> |
| Email address, e.g., "user@hosts.com" | [a-z0-9_-]+\(\.[a-z0-9_-]*\)@[a-z0-9_-]+\(\.[a-z0-9]+\)+ |
| Email address, e.g., "Joe Doe" | \("?[a-zA-Z]+"?[\t]*^\<\(\.[a-z0-9_-]*\)@[a-z0-9_-]+\(\.[a-z0-9]+\)+\> |
| Protocol Validity matches web base protocol such as http://ftp://https:// | [a-z]+:// |

In the examples in Table 1, some typical regular expressions are presented that can be used in the present invention. The present invention is based on the following principles. (1) Regular expression are defined for identifying a specific user defined data type. (2) Depending on the context (which is the running application), the possibility is given to the user, through a contextual menu, to launch a pre-programmed application with the identified character string as variable.

Physical view

As shown in FIG. 1A, the present invention may be embodied on a computer system 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors including IBM of Armonk, N.Y.

Figure 1B:
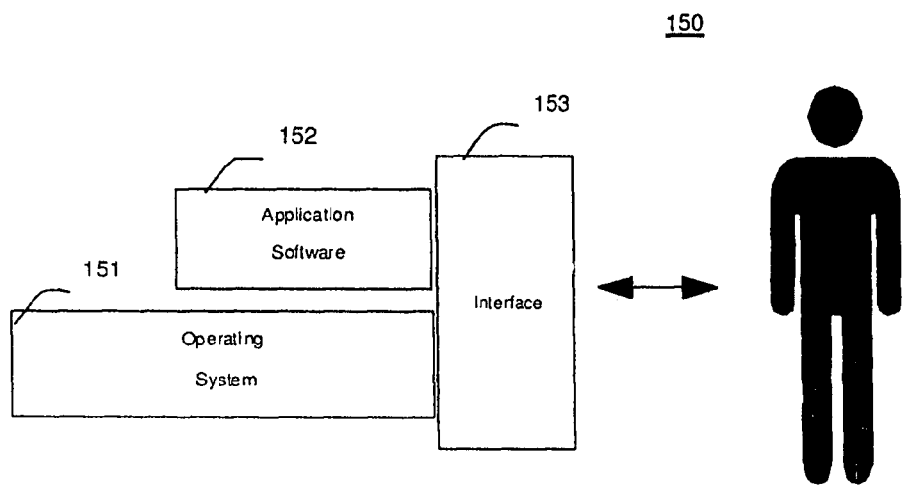
FIG. 1B shows a block diagram of a software system including an operating system, an application software, and a user interface for carrying out the present invention.

As illustrated in FIG. 1B, a computer software system 150 is provided for directing the operation of the computer system 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the system 100. The system 100 receives user commands and data through user interface 153; these inputs may then be acted upon by the system 100 in accordance with instructions from operating module 151 and/or application module 152. The interface 153, which is preferably a graphical user interface (GUI), also serves to display results, whereupon the user may supply additional inputs or terminate the session. In a preferred embodiment, operating system 151 and interface 153 are Microsoft Win2000/XP, available from Microsoft Corporation of Redmond, Wash. Application module 152, includes a data type analyzer and an application launcher of the present invention as described in further detail herein below.

Logical Tables (1) Parser Table. FIG. 2A depicts a table called Parser Table in the present description. The Parser Table 200 is a two column table, where the first column represents a regular expression 210, and the second column represents the DATA Type 220 corresponding to the regular expression. Each regular expression and data type is user defined. The three rows 230, 231, and 233 are associated with different data types, respectively named "MSISDN", "Email", and "GSM MSISDN."

(2) Launcher Table. FIG. 2B depicts a table called Launcher Table in the present description, and which preferably includes five different records 290, 291, 292, 293, and 294. To each DATA Type corresponds an entry 260 in the Launcher Table 250. Each entry preferably includes (a) the DATA Type 220 defined in the Parser Table (See FIG. 2A), (b) the active application 265 which is the application managing the window in which the characters string has been selected, (c) the target application 270 which is the application to be launched when the selected characters string is identified as having the Data type corresponding to this entry, and (d) the Usage Frequency which defines the rate usage of this target application.

If no active application is defined or an "*" has been set, this entry is used for any application. This field allows to define different target applications for the same data type, potentially depending on the active application. For instance, the record 293 specifies that a data type "Email" is associated to the target application "Outlook" when the active application is "Word", while the record 294 specifies that the same data type "Email" is associated to the target application "Lotus Notes" when the active application is "Wordpro".

Figure 3:
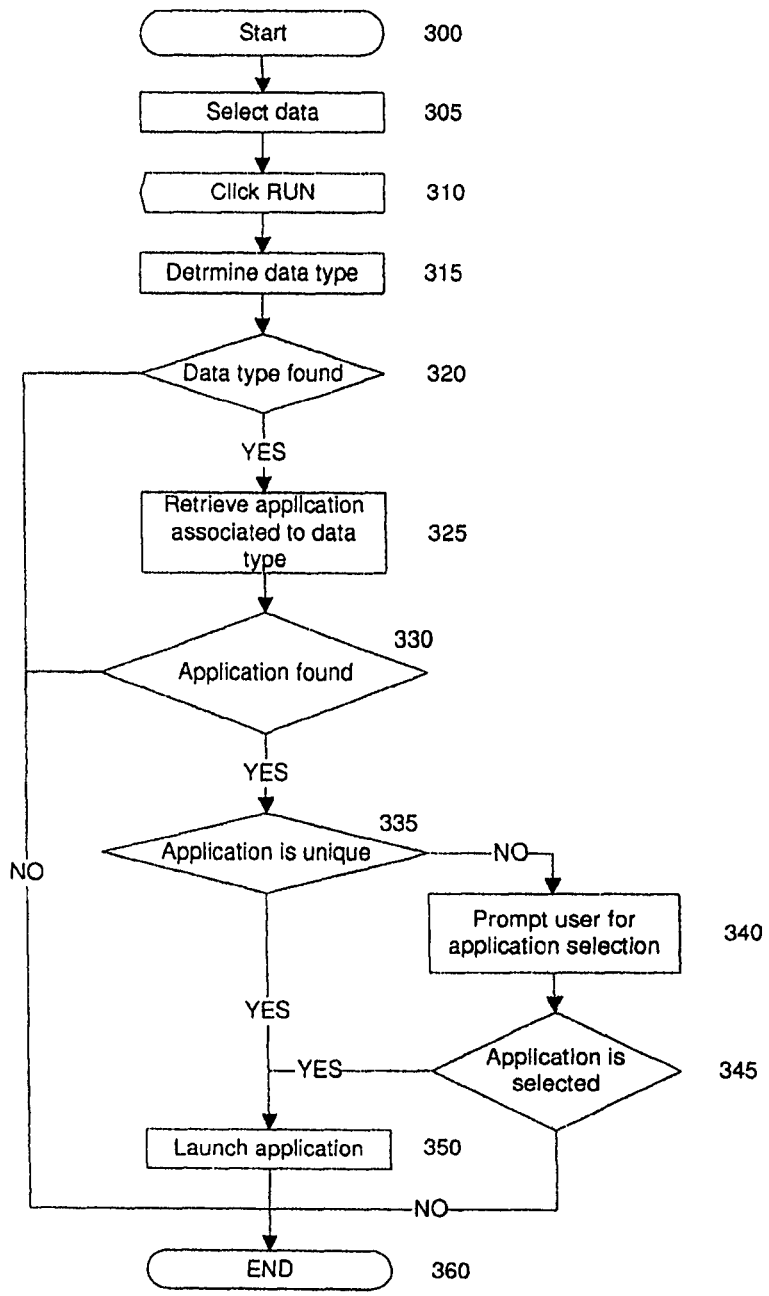
FIG. 3 shows a flow chart describing the steps of the method according to the present invention.

FIG. 3 depicts the flow chart describing the steps of the method according to the present invention. At step 300, the method is initialized and starts. At step 305, a user in the source application selects a string of characters. At step 310, the user executes in a preferred embodiment a right click on the mouse on the selected string of characters to launch an application associated with this string of characters. At step 315, a process for determining the selected data type is started. This process parses the selected string of character using the previously described Parser Table 200 (FIG. 2A). Each entry of the Parser Table 200 is scanned to match a user defined regular expression with the selected string of characters. As soon as the string of characters matches a regular expression, the data type corresponding to the regular expression matching the string of character is saved in a local variable. The scanning continues until the end of the Parser Table 200.

If a new entry match again the characters string, case of subtype (type refinement), the newly detected type is saved in place of the previously saved data type. This means that the user must take care of the regular expression order, defining the most general rule in first, and refining the rule after.

As example, a string of ten digits beginning by "0" in France, may be considered as a telephone number (type MSISDN). It is true for both number "0492114000" and "0612345678". But if a rule associating a type "GSM MSISDN" is added, if the second digit is equal to "6", then the characters string "0612345678" will be typed "GSM MSISDN" while characters string "0492114000" will be typed "MSISDN".

At step 320, when the Parser Table 200 is fully scanned, the process determines whether or not a data type is identified for the selected string of characters. If it is the case, then control is given to step 325; otherwise control is given to step 360. At step 325, the application(s) associated with this data type and the source application type is(are) retrieved. This "retrieve process" uses the Launcher Table 250 (FIG. 2B) and creates a temporary table containing the target application 270 and the percentage of usage 275 for each entry of the Launcher Table 250 which matches the previously identified data type and active application.

At step 330, the process checks whether at least one application associated with this data type and the source application has been identified at the previous step. If it is the case, then control is given to step 335; otherwise control is given to step 360. At step 335, the process checks whether a single application has been identified at step 325. If it is the case, then control is given to step 350; otherwise control is given to step 340.

At step 340, the user is prompted with a list box comprising all applications eligible to process the data type identified. This list box presents all applications ordered by their percentage of use, with the more used application in first. At step 345, a test is performed to check if the user has selected an application. If it is the case, then control is given to step 350; otherwise control is given to step 360. At step 350, the either unique or user selected target application is launched with the user selected characters string as argument or parameter. At step 360, the process is ended.

The description focuses on the presently preferred embodiments of the present invention, which are embodied in an application operative in the Microsoft Windows environment. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, NextStep, and the like. Therefore, the description of the exemplary embodiments is for purposes of illustration and not limitation. While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A method for automatically launching a target application based on characteristics of a string of characters in a source application, said method comprising the steps of:

a processor of a computer receiving a first command and the string selected by a user in the source application, wherein the first command dictates launching of the target application with the string as a parameter, wherein the target application has a distinctive utility other than interacting with the user, wherein said distinctive utility of the target application is functionally corresponding to the string, wherein the source application enables the user to input, edit and delete the string within the source application, the source application running by use of functionalities of an operating system of the computer;

identifying a predefined data type previously associated with a regular expression matching the string, wherein at least one regular expression including the regular expression collectively formulates a set of strings including the string, wherein said at least one regular expression is predefined by use of alphanumeric characters, symbols, and operations pursuant to regular expression syntax, wherein the regular expression and the predefined data type is a row in a parser table, wherein the parser table comprises at least one row including the row, each row of said at least one row comprising a respective regular expression and a respective data type associated with the respective regular expression, and wherein the parser table is indexed by a respective regular expression of said at least one row;

identifying the target application previously associated with a combination of the identified data type and the source application, wherein the identified data type, the source application, the target application, and a usage frequency of the target application are in a record in a launcher table, wherein the launcher table comprises at least one record including the record, each record of said at least one record comprising a respective data type, a respective source application in which a respective string matching the respective data type is selected by a respective user, a respective target application associated with a respective combination of the respective data type and the respective source application, and a respective usage frequency of the respective target application; and launching the target application with the string as the parameter, wherein the step of identifying the predefined data type comprises the steps of:

determining that a first row of the parser table comprises a first regular expression formulating the string, wherein rows of the parser table is ordered from a more general regular expression to a more specific regular expression, wherein the symbols used in said at least one regular expression comprises zero or more meta characters, zero or more quantifiers, and zero or more anchors, and wherein the operations used in said at least one regular expression comprise alteration, grouping, and quantification;

setting the first regular expression as the regular expression matching the string;

resetting the regular expression with the second regular expression upon determining a second regular expression of a next row of the parser table formulates the string more specifically than the stored first regular expression; and selecting the predefined data type in the row of the regular expression as the predefined data type of the string, upon performing said resetting for all rows of the parser table.

2. The method according to claim 1, wherein the step of identifying the target application comprises the steps of:

identifying, from the launcher table, at least one matching record that is previously associated with the identified data type, wherein the predefined data type is selected from the group consisting of Mobile Station Integrated Services Digital Network (MSISDN) number, Global System for Mobile Communications (GSM) MSISDN number, and an electronic mail (e-mail) address, wherein each record <data type, target application> of the launcher table is selected from the group consisting of <MSISDN number, voice telecommunication application>, <GSM MSISDN number, voice telecommunication application>, <GSM MSISDN number, Short Messaging Service application>, and <e-mail address, e-mail application>;

prompting, upon determining that more than one record in the launcher table is identified from said identifying, the user to select the target application among a respective target application of said more than one identified record; and responsive to said prompting, receiving a second command that selects the target application among the respective target application of said more than one identified record.

3. The method according to claim 2, wherein the step of prompting comprises the steps of:

presenting to the user a list comprising said at least one target application in an order of the respective usage frequency associated with the respective target application in said at least one matching record such that a first target application that has been most frequently used is displayed on the top of the list.

4. A system comprising a processor, a memory coupled to the processor, and a computer readable mass storage device coupled to the processor, said storage device containing program code configured to be executed by the processor via the memory to implement a method for automatically launching a target application based on characteristics of a string of characters in a source application, comprising:

receiving a first command and the string selected by a user in the source application, wherein the first command dictates launching of the target application with the string as a parameter, wherein the target application has a distinctive utility other than interacting with the user, wherein said distinctive utility of the target application is functionally corresponding to the string, the source application running by use of functionalities of an operating system of a computer;

identifying a predefined data type previously associated with a regular expression matching the string, wherein at least one regular expression including the regular expression collectively formulates a set of strings including the string, wherein said at least one regular expression is predefined by use of alphanumeric characters, symbols, and operations pursuant to regular expression syntax, wherein the regular expression and the predefined data type is a row in a parser table, wherein the parser table comprises at least one row including the row, each row of said at least one row comprising a respective regular expression and a respective data type associated with the respective regular expression, and wherein the parser table is indexed by a respective regular expression of said at least one row;

identifying the target application previously associated with a combination of the identified data type and the source application, wherein the identified data type, the source application, the target application, and a usage frequency of the target application are in a record in a launcher table, wherein the launcher table comprises at least one record including the record, each record of said at least one record comprising a respective data type, a respective source application in which a respective string matching the respective data type is selected by a respective user, a respective target application associated with a respective combination of the respective data type and the respective source application, and a respective usage frequency of the respective target application; and launching the target application with the string as the parameter, wherein said identifying the predefined data type comprises:

determining that a first row of the parser table comprises a first regular expression formulating the string, wherein rows of the parser table is ordered from a more general regular expression to a more specific regular expression, wherein the symbols used in said at least one regular expression comprises zero or more meta characters, zero or more quantifiers, and zero or more anchors, and wherein the operations used in said at least one regular expression comprise alteration, grouping, and quantification;

setting the first regular expression as the regular expression matching the string;

resetting the regular expression with the second regular expression upon determining a second regular expression of a next row of the parser table formulates the string more specifically than the stored first regular expression; and selecting the predefined data type in the row of the regular expression as the predefined data type of the string, upon performing said resetting for all rows of the parser table.

5. The system according to claim 4 wherein said identifying the target application comprises:

identifying, from the launcher table, at least one matching record that is previously associated with the identified data type, wherein the predefined data type is selected from the group consisting of Mobile Station Integrated Services Digital Network (MSISDN) number, Global System for Mobile Communications (GSM) MSISDN number, and an electronic mail (e-mail) address, wherein each record <data type, target application> of the launcher table is selected from the group consisting of <MSISDN number, voice telecommunication application>, <GSM MSISDN number, voice telecommunication application>, <GSM MSISDN number, Short Messaging Service application>, and <e-mail address, e-mail application>;

prompting, upon determining that more than one record in the launcher table is identified from said identifying, the user to select the target application among a respective target application of said more than one identified record; and receiving, responsive to said prompting, a second command that selects the target application among the respective target application of said more than one identified record.

6. The system according to claim 5, wherein the means for prompting comprises:

presenting to the user a list comprising said at least one target application in an order of the respective usage frequency associated with the respective target application in said at least one matching record such that a first target application that has been most frequently used is displayed on the top of the list.

7. A program product comprising a computer readable hardware mass storage device storing computer readable program code for implementing a method for automatically launching a target application based on characteristics of a string of characters in a source application, said method comprising the steps of:

receiving a first command and the string selected by a user in the source application, wherein the first command dictates launching of the target application with the string as a parameter, wherein the target application has a distinctive utility other than interacting with the user, wherein said distinctive utility of the target application is functionally corresponding to the string, wherein the source application enables the user to input, edit and delete the string within the source application, the source application running by use of functionalities of an operating system of a computer;

identifying a predefined data type previously associated a regular expression matching the string, wherein at least one regular expression including the regular expression collectively formulates a set of strings including the string, wherein said at least one regular expression is predefined by use of alphanumeric characters, symbols, and operations pursuant to regular expression syntax, wherein the regular expression and the predefined data type is a row in a parser table, wherein the parser table comprises at least one row including the row, each row of said at least one row comprising a respective regular expression and a respective data type associated with the respective regular expression, and wherein the parser table is indexed by a respective regular expression of said at least one row;

identifying the target application previously associated with a combination of the identified data type and the source application, wherein the identified data type, the source application, the target application, and a usage frequency of the target application are in a record in a launcher table, wherein the launcher table comprises at least one record including the record, each record of said at least one record comprising a respective data type, a respective source application in which a respective string matching the respective data type is selected by a respective user, a respective target application associated with a respective combination of the respective data type and the respective source application, and a respective usage frequency of the respective target application; and launching the target application with the string as the parameter, wherein the step of identifying the predefined data type comprises the steps of:
- determining that a first row of the parser table comprises a first regular expression formulating the string, wherein rows of the parser table is ordered from a more general regular expression to a more specific regular expression, wherein the symbols used in said at least one regular expression comprises zero or more meta characters, zero or more quantifiers, and zero or more anchors, and wherein the operations used in said at least one regular expression comprise alteration, grouping, and quantification;
- setting the first regular expression as the regular expression matching the string;
- resetting the regular expression with the second regular expression upon determining a second regular expression of a next row of the parser table formulates the string more specifically than the stored first regular expression; and
- selecting the predefined data type in the row of the regular expression as the predefined data type of the string, upon performing said resetting for all rows of the parser table.

8. The program product according to claim 7 wherein the step of identifying the target application comprises the steps of:
- identifying, from the launcher table, at least one matching record that is previously associated with the identified data type, wherein the predefined data type is selected from the group consisting of Mobile Station Integrated Services Digital Network (MSISDN) number, Global System for Mobile Communications (GSM) MSISDN number, and an electronic mail (e-mail) address, wherein each record <data type, target application> of the launcher table is selected from the group consisting of <MSISDN number, voice telecommunication application>, <GSM MSISDN number, voice telecommunication application>, <GSM MSISDN number, Short Messaging Service application>, and <e-mail address, e-mail application>;
- prompting, upon determining that more than one record in the launcher table is identified from said identifying, the user to select the target application among a respective target application of said more than one identified record; and
- responsive to said prompting, receiving a second command that selects the target application among the respective target application of said more than one identified record.

9. The program product according to claim 8, wherein the step of prompting comprises the steps of:
- presenting to the user a list comprising said at least one target application in an order of the respective usage frequency associated with the respective target application in said at least one matching record such that a first target application that has been most frequently used is displayed on the top of the list.

* * * * *